United States Patent [19]
Balling

[11] Patent Number: 5,930,540
[45] Date of Patent: Jul. 27, 1999

[54] CAMERA WITH MULTIPLE SPRING DRIVE

[75] Inventor: Edward N. Balling, Rochester, N.Y.

[73] Assignee: Eastman Kodak Company, Rochester, N.Y.

[21] Appl. No.: 09/108,694

[22] Filed: Jul. 1, 1998

[51] Int. Cl.$^6$ .................................................. G03B 1/00
[52] U.S. Cl. ............................................................ 396/412
[58] Field of Search ................................... 396/387, 411, 396/412

[56] References Cited

U.S. PATENT DOCUMENTS

| | | |
|---|---|---|
| 1,197,901 | 9/1916 | Bornmann et al. . |
| 2,472,823 | 6/1949 | Harlow . |
| 3,535,994 | 10/1970 | Maas et al. . |
| 4,226,517 | 10/1980 | Skarman . |
| 5,465,129 | 11/1995 | Vaynshteyn . |

*Primary Examiner*—Howard B. Blankenship
*Attorney, Agent, or Firm*—Roger A. Fields

[57] ABSTRACT

A camera comprising a film winder rotatable to wind successive exposed imaging areas of a filmstrip onto an exposed film roll, is characterized in that a minor spring source of motion is connected to the film winder to rotate the film winder to wind one exposed imaging area of the filmstrip onto the exposed film roll and can be re-energized to again rotate the film winder to wind another exposed imaging area of the filmstrip onto the exposed film roll, and a major spring source of motion is connected with the minor spring source of motion to re-energize the minor spring source of motion after each exposed imaging area of the filmstrip is wound onto the exposed film roll. Preferably, the major spring source of motion has the capacity to be energized once to re-energize the minor spring source of motion a total number of times at least equal to the total number of successive imaging areas of the filmstrip that are to be exposed.

12 Claims, 7 Drawing Sheets

CAMERA WITH MULTIPLE SPRING DRIVE

FIELD OF THE INVENTION

The invention relates generally to the field of photography, and in particular to cameras. More specifically, the invention relates to a one-time-use camera with a multiple-spring film drive.

BACKGROUND OF THE INVENTION

Film and cameras that are all in one, commonly referred to as single-use or one-time-use cameras, have become well known. Typically, the one-time-use camera is a simple point-and-shoot type comprising a plastic main body part which supports a conventional film cartridge in a cartridge receiving chamber, an unexposed film roll in a film supply chamber, a fixed-focus taking lens, a film metering mechanism with a rotatably supported metering sprocket that engages the filmstrip, a manually rotatable film winding thumbwheel rotatably engaged with a film spool inside the film cartridge, a single-blade shutter, a manually depressible shutter release button, a rotatable exposure or frame counter for indicating the number of exposures remaining to be made on the filmstrip, a direct see-through viewfinder, and in some models an electronic flash. A pair of plastic front and rear cover parts house the main body part between them to complete the camera unit. The rear cover part connects to the main body part and/or to the front cover part to make the main body part light-tight. A decorative cardboard outer box or label at least partially covers the camera unit and has respective openings for the taking lens, etc.

After each picture is taken with the one-time-use camera, the photographer rotates the manual thumbwheel in a film winding direction to similarly rotate the film spool inside the film cartridge. This winds an exposed section of the filmstrip into the film cartridge. The rewinding movement of the filmstrip the equivalent of slightly more than one frame width rotates the metering sprocket in engagement with the filmstrip to decrement the exposure counter to its next lower-numbered setting and to pivot a metering lever into engagement with the thumbwheel in order to prevent further manual rotation of the thumbwheel. Manually depressing the shutter release button to take another picture pivots the metering lever out of engagement with the thumbwheel to permit renewed rotation of the thumbwheel. When the maximum number of exposures available on the filmstrip have been made, and the filmstrip is completely wound into the film cartridge, the one-time-use camera is given to a photofinisher who tears the outer box off the camera unit, separates the rear cover part from the main body part, and removes the film cartridge with the exposed filmstrip from the cartridge receiving chamber. Then, he removes the exposed filmstrip from the film cartridge to develop the negatives and make prints for the customer. At least some of the used camera parts may be recycled, i.e. reused, to remanufacture the camera.

Problem

It would be of benefit to the consumer to motorize one-time-use cameras. Since electric motors are relatively expensive, especially in the context of a one-time-use camera, spring drives must be considered. Prior art spring devices that generally involved a single spring drive warrant improvement.

SUMMARY OF THE INVENTION

A camera comprising a film winder rotatable to wind successive exposed imaging areas of a filmstrip onto an exposed film roll, is characterized in that:

a minor spring source of motion is connected to the film winder to rotate the film winder to wind one exposed imaging area of the filmstrip onto the exposed film roll and can be re-energized to again rotate the film winder to wind another exposed imaging area of the filmstrip onto the exposed film roll; and a major spring source of motion is connected with the minor spring source of motion to re-energize the minor spring source of motion after each exposed imaging area of the filmstrip is wound onto the exposed film roll.

Preferably, the major spring source of motion has the capacity to be energized once to re-energize the minor spring source of motion a total number of times at least equal to the total number of successive imaging areas of the filmstrip that are to be exposed.

DETAILED DESCRIPTION OF THE INVENTION

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Figure 1:
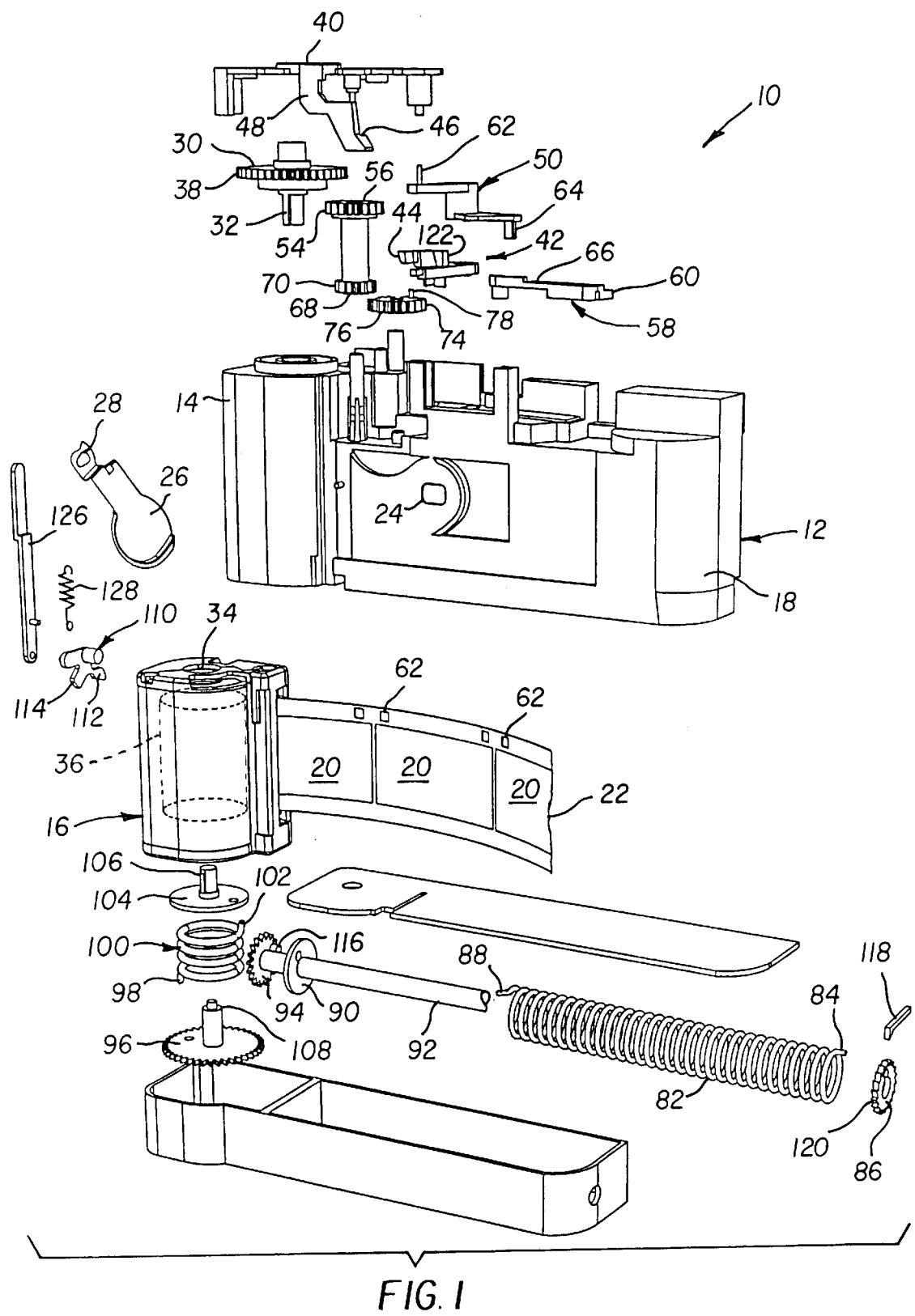
FIG. 1 is an exploded perspective view of a one-time-use camera according to a preferred embodiment of the invention.

Referring now to the drawings, FIG. 1 partially shows a one-time-use camera 10 including an opaque main body part 12. A pair of opaque front and rear cover parts (not shown) house the main body part between them.

Figure 2:
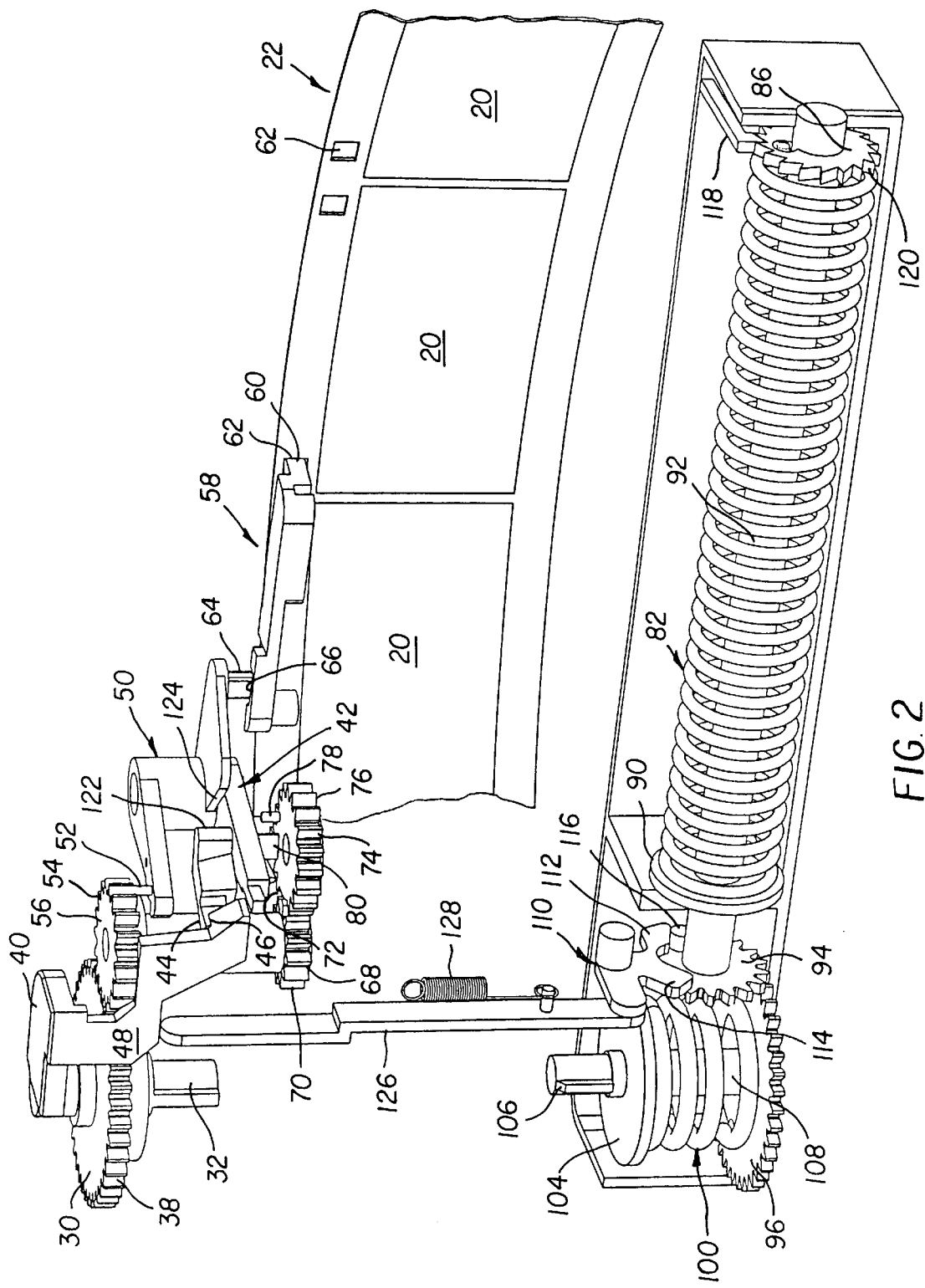
FIG. 2 is an assembled perspective view a film metering assembly and multiple spring drive in the camera.
Figure 4:
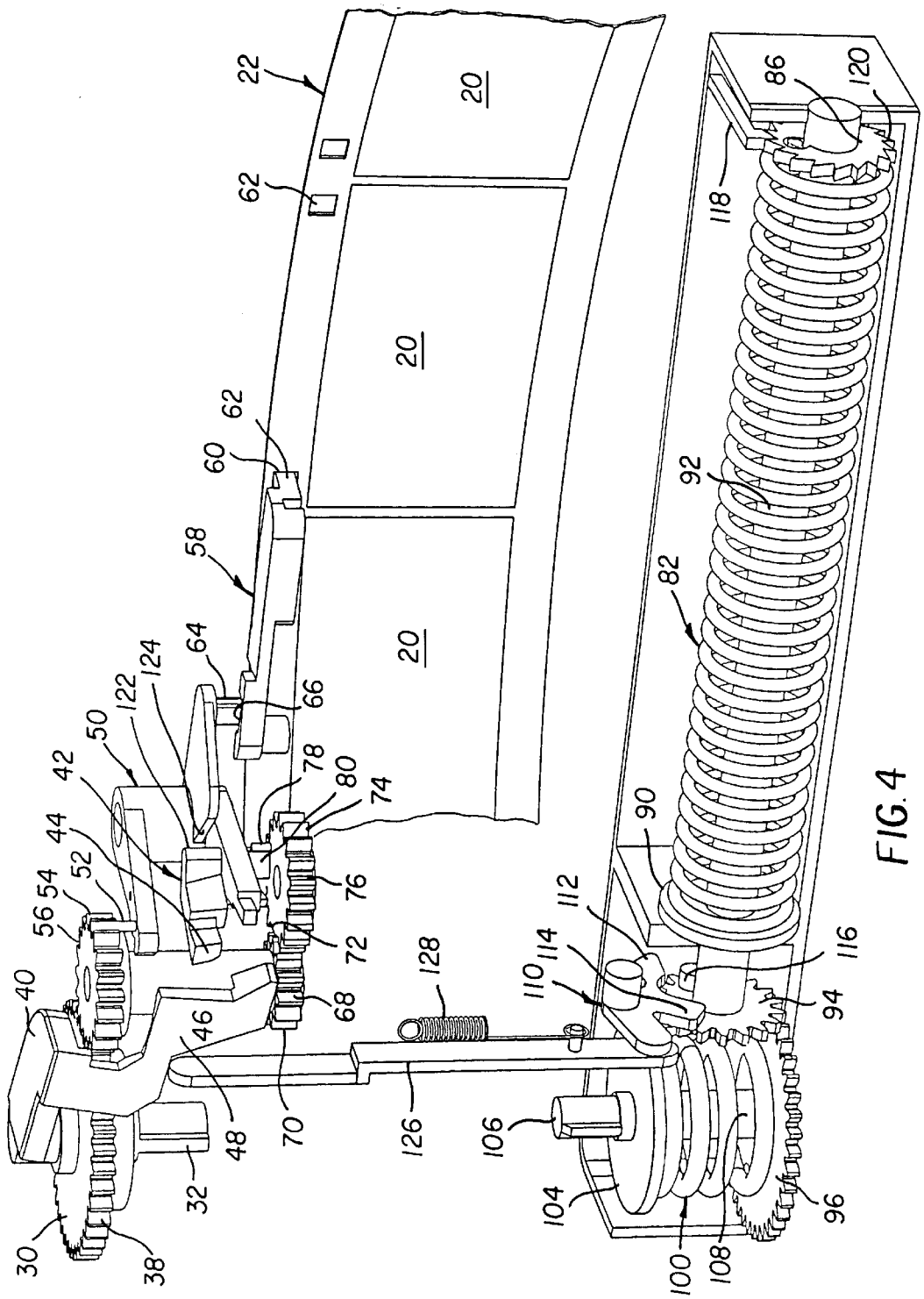
FIGS. 4, 5, 6 and 7 are perspective views similar to FIG. 2, depicting operation of the film metering assembly and multiple spring drive.

The main body part 12 has a rearwardly open cartridge receiving chamber 14 for a known film cartridge 16 and a rearwardly open film supply chamber 18 for an unexposed film roll (not shown). See FIG. 1. A backframe opening (not shown) is located between the cartridge receiving and film take-up chambers 14 and 18 for exposing successive imaging areas 20 of a filmstrip 22 initially stored on the unexposed film roll (not shown). The backframe opening (not shown) is aligned with a front aperture 24 in the main body part 12. A known shutter blade 26 normally covers the front aperture 24. The shutter blade 26 is supported on the main body part 12 at a body part post (not shown) that extends through a blade slot 28, to permit pivotal opening and closing movement of the shutter blade clockwise and counter-clockwise in FIG. 1 in order to uncover and recover the front aperture 24. A return spring (not shown) is connected to the shutter blade 26 and the main body part 12 to continuously urge the shutter blade closed. A metering drive gear 30 has a depending coaxial keyed stem 32 in coaxial engagement with one mating end 34 of a film spool inside the film cartridge 16, and is supported on the main body part 12 for rotation counter-clockwise in FIG. 1 as each exposed imaging area 20 of the filmstrip 22 is wound onto an exposed film roll 36 formed on the film spool and each fresh (unexposed) imaging area is advanced from the unexposed film roll (not shown) to the backframe opening. An anti-backup pawl (not shown) engages respective peripheral teeth 38 of the metering drive gear 30 to prevent clockwise rotation of the metering drive gear. A resilient cantilevered shutter release button 40 is manually depressible from an original non-depressed position shown in FIGS. 1 and 2 to initiate an exposure. A high energy lever 42 for pivoting the shutter blade 26 open is pivotally supported on the main body part 12 and is shown in FIG. 2 in a cocked ready position. A high energy spring (not shown) is connected to the high energy lever 42 and the main body part 12 to continuously urge the high energy lever counter-clockwise in FIG. 2 from its cocked ready position, initially to pivot the shutter blade 26 open. See FIG. 4. In FIG. 2, engagement of an end portion 44 of the high energy lever 42 with a notch portion 46 of an integral leg 48 of the shutter release button 40 retains the high energy lever 42 in its cocked ready position against the counter-clockwise urging of the high energy spring (not shown). A metering lever 50 is pivotally supported on the main body part 12 at an axis (not shown) in common with the high energy lever 42; although it is pivotable independently of the high energy lever. The metering lever 50 has an upstanding arresting pin 52 that engages respective peripheral teeth 54 of a first intermediate gear 56 continuously in mesh with the peripheral teeth 38 of the metering drive gear 30, to prevent any rotation of the metering drive gear. A return spring (not shown) is connected to the metering lever 50 and the main body part 12 to continuously urge the metering lever clockwise in FIG. 2 to maintain the arresting pin 52 engaged with any one of the peripheral teeth 54. A metering pawl 58 is pivotally and translationally supported on the main body part 12 and has a pawl tooth 60 that is received in respective metering perforations 62 in the filmstrip 22. Each metering perforation 62 corresponds to one of the imaging areas 20 of the filmstrip 22 A depending pin 64 on the metering lever 50 engages a notch portion 66 of the metering pawl 58 to prevent translation of the metering pawl when the arresting pin 52 is engaged with one of the peripheral teeth 54. The filmstrip 22 is then said to be "metered", as shown in FIGS. 2 and 4, when one of its imaging areas 20 is at the backframe opening (not shown), the arresting pin 52 is engaged with one of the peripheral teeth 54, the pawl tooth 60 is located in one of the metering perforations 62, and the depending pin 64 engages the notch portion 66. A second intermediate gear 68 is coaxially connected to the first intermediate gear 56 and has respective peripheral teeth 70 which in FIGS. 2 and 4 are located within a dwell or gap 72 between successive peripheral teeth 74 of a reset gear 76, i.e. none of the teeth 70 and 74 are mutual engaged. The reset gear 76 has an upstanding reset pin 78 intended to be swung counter-clockwise against a depending tab 80 on the high energy lever 42 to swing the high energy lever clockwise in FIGS. 6 and 7 back to its cocked ready position when the metering drive gear 30 is rotated counter-clockwise.

Figure 3:
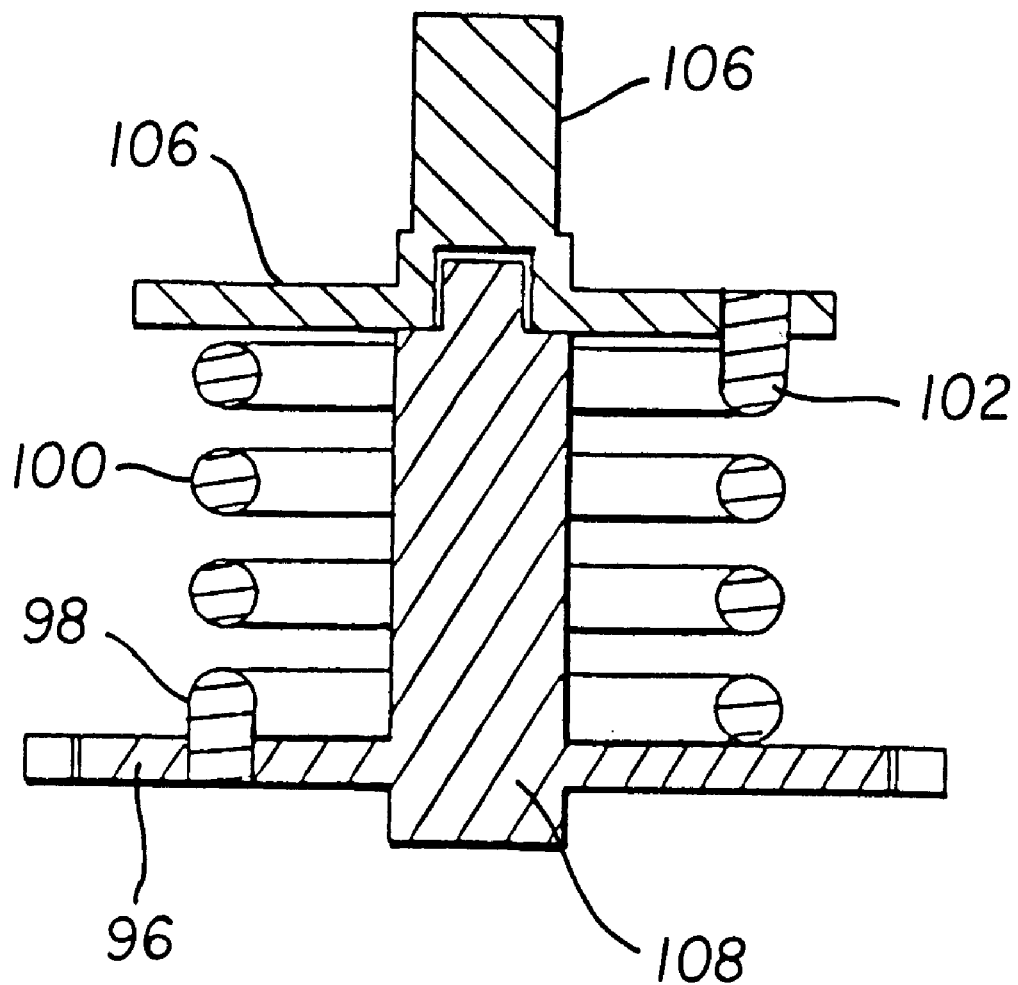
FIG. 3 is an elevation section view of a portion of the multiple spring drive.

A major high-torque torsion spring 82 has one end 84 fixed to a winding ratchet 86 and another end 88 fixed to a flange 90. The flange 90 is integral with a center shaft 92 and a drive gear 94. See FIGS. 1 and 2. The drive gear 94 is continuously in mesh with a driven gear 96 fixed to one end 98 of a minor low-torque torsion spring 100. The minor torsion spring 100 has another end 102 fixed to a flange 104 integral with an upstanding keyed stem 106 that coaxially engages another mating end (not shown) of the film spool inside the film cartridge 16. As shown in FIG. 3, the flange 104 and the upstanding keyed stem 106 are rotatably supported on a center shaft 108 integral with the driven gear 96. A release lever 110 is pivotally supported on the main body part 12 and has a pair of angled projections 112 and 114 that independently engage a locking pin 116 on the drive gear 94 to prevent spring-driven rotation of the drive gear counter-clockwise in FIGS. 1 and 2 and, in turn, gear-driven rotation of the driven gear 96 counter-clockwise in FIGS. 1 and 2. An anti-backup pawl 118 engages respective teeth 120 of the winding ratchet 86 to prevent unwinding rotation of the ratchet clockwise in FIGS. 1 and 2.

Operation

Beginning with FIG. 2, the winding ratchet 86 must be windingly rotated counter-clockwise to energize (wind) the major torsion spring 82. This can be done manually or with a suitable winding implement. The major torsion spring 82 is energized (wound) when the winding ratchet 86 is rotated counter-clockwise because the flange 90 is prevented from similarly rotating due to engagement of the angled projection 112 of the release lever 110 with the locking pin 116 on the drive gear 94. The minor torsion spring 100 is not energized (wound) since the drive gear 94 is not rotated.

Figure 5:
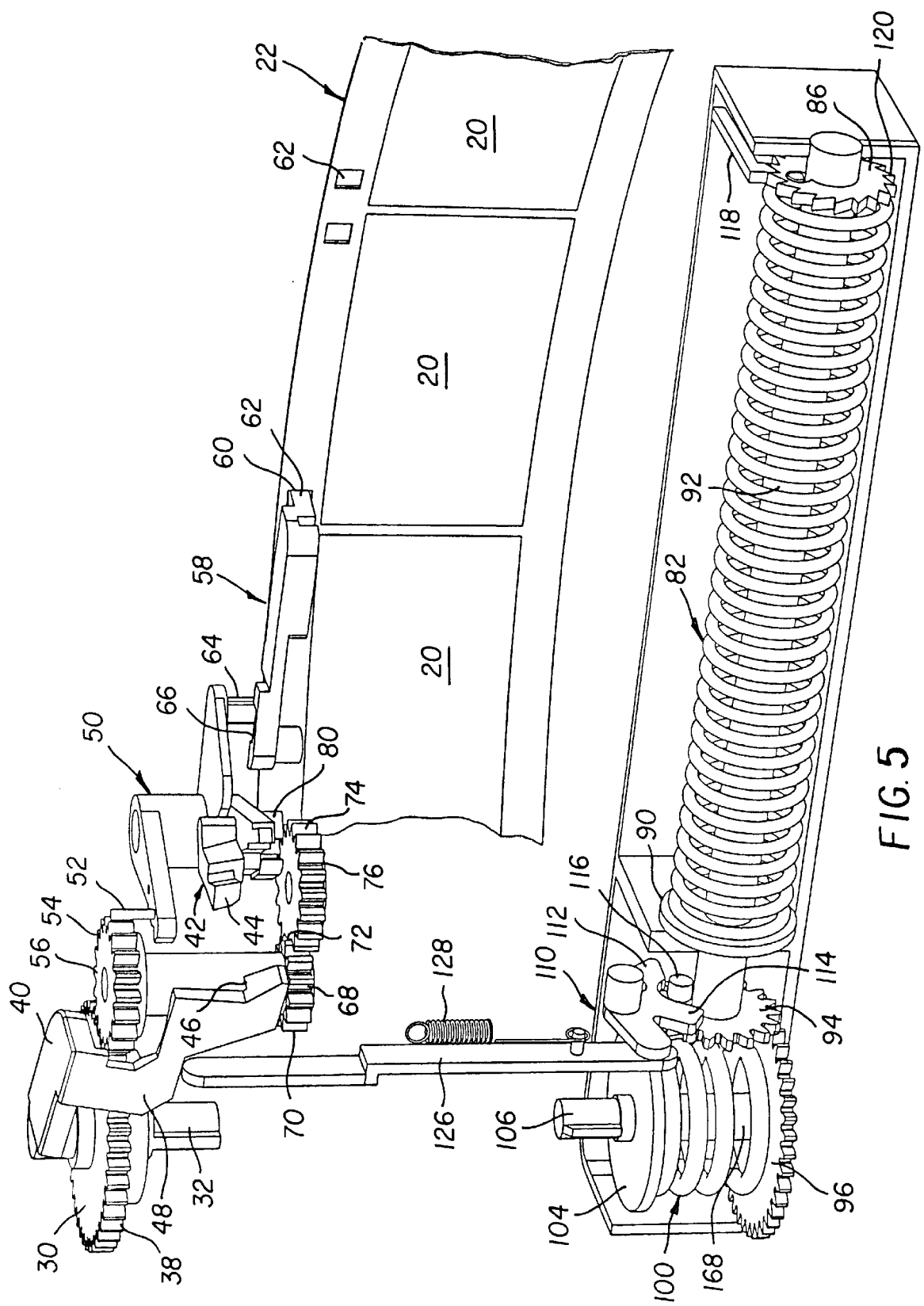

In FIG. 4, the shutter release button 40 is manually depressed from its original non-depressed position to initiate an exposure. Several things occur as a result. The notch portion 46 of the integral leg 48 of the shutter release button 40 separates from the end portion 44 of the high energy lever 42. This allows the high energy spring (not shown) to pivot the high energy lever 42 counter-clockwise in FIG. 4 from its cocked ready position, initially to pivot the shutter blade 26 open. When the return spring (not shown) has re-closed the shutter blade 26, the high energy lever 42 will have pivoted to swing an edge portion 122 of the high energy lever against an opposite portion 124 of the metering lever 50 to pivot the metering lever counter-clockwise in FIG. 5 and the depending tab 80 on the high energy lever will have swung against the upstanding reset pin 78 on the reset gear 76 to begin to rotate the reset gear counter-clockwise in FIG. 5. Counter-clockwise rotation of the reset gear 76 moves one of the peripheral teeth 74 (adjacent the dwell 72) of the reset gear into engagement with one of the peripheral teeth 70 of the second intermediate gear 68. Counter-clockwise pivoting of the metering lever 50 separates the upstanding arresting pin 52 on the metering lever from one of the peripheral teeth 54 of the first intermediate gear 56, allowing the metering drive gear 30 to be rotated counter-clockwise in FIG. 5, and the depending pin 64 on the metering lever is separated from the notch portion 66 of the metering pawl 58, allowing the metering pawl to be translated. The filmstrip 22 is then said to be "demetered".

When the shutter release button 40 is manually depressed from its original non-depressed position in FIG. 4, a follower arm 126 which is supported on the main body part 12 for translation and is pivotally connected to the release lever 110 is translated downward in FIG. 4 to pivot the release lever counter-clockwise. This separates the angled projection 112 of the release lever 10 from the locking pin 116 on the drive gear 94, allowing the major torsion spring 82 to slightly unwind and rotate the drive gear 94 counter-clockwise in FIG. 5 to swing the locking pin against the angled projection 114 of the release lever. Rotation of the drive gear 94, in turn, rotates the driven gear 96 counter-clockwise in FIG. 5 to partially energize (wind) the minor torsion spring 100. This occurs before the shutter blade 26 is pivoted open (and, therefore, before the upstanding arresting pin 52 on the metering lever 50 is separated from one of the peripheral teeth 54 of the first intermediate gear 56). When the shutter blade 26 has re-closed and then the upstanding arresting pin 52 on the metering lever 50 is separated from one of the peripheral teeth 54 of the first intermediate gear 56, the minor torsion spring 100 begins to unwind to rotate the flange 104 and its upstanding keyed stem 106 counter-clockwise in FIG. 5 to begin to windingly rotate the film spool inside the film cartridge 16. As a result, the exposed imaging area 20 of the filmstrip 22 at the backframe opening (not shown) will be wound toward the exposed film roll 20 inside the film cartridge 16 and an unexposed imaging area will be advanced from the unexposed film roll (not shown) toward the backframe opening. The metering pawl 58 is translated with the filmstrip 22 to the left in FIG. 5 since the pawl tooth 60 is in one of the metering perforations 62 in the filmstrip. The metering drive gear 30 begins to be rotated counter-clockwise in FIG. 5 in order to rotate the reset gear 76 counter-clockwise in FIG. 5. This begins to swing the upstanding reset pin 78 on the reset gear 76 counter-clockwise against the depending tab 80 on the high energy lever 42 to begin to swing the high energy lever clockwise in FIG. 5 back to its cocked ready position.

Figure 6:
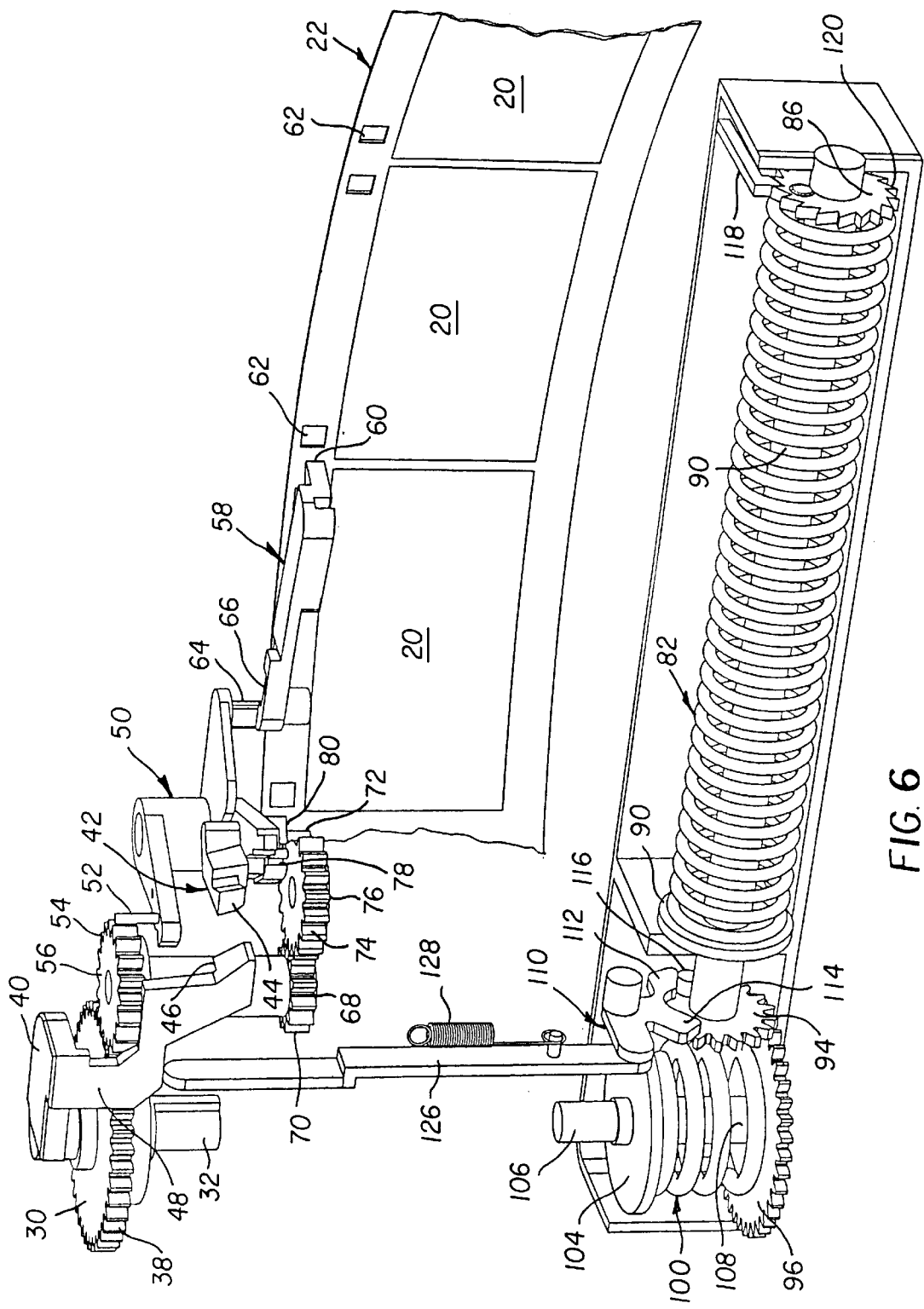

In FIG. 6, the shutter release button 40 is manually released from being manually depressed and is returned to its original non-depressed position. As a result, a return spring 128 which is connected to the follower arm 126 and the main body part 12 translates the follower arm upward in FIG. 6 to pivot the release lever 110 clockwise and separate the angled projection 114 of the release lever from the locking pin 116 on the drive gear 94. This allows the major torsion spring 82 to continue to slightly unwind and rotate the drive gear 94 counter-clockwise in FIG. 6 to swing the locking pin 116 on the drive gear back to the angled projection 112 of the release lever 110. Rotation of the drive gear 94, in turn, rotates the driven gear 94 counter-clockwise in FIG. 6 to further energize (wind) the minor torsion spring 100. The minor torsion spring 100 simultaneously continues to unwind to rotate the flange 104 and its upstanding keyed stem 106 counter-clockwise in FIG. 6 to continue to windingly rotate the film spool inside the film cartridge 16. As a result, the exposed imaging area 20 of the filmstrip 22 will be wound onto the exposed film roll 20 inside the film cartridge 16 and the unexposed imaging area will be advanced to the backframe opening. The pawl tooth 60 exits the metering perforation 62 for the exposed imaging area and enters the metering perforation for the unexposed imaging area as the filmstrip 22 is advanced to the left in FIG. 6. The metering drive gear 30 continues to be rotated counter-clockwise in FIGS. 6 and 7 in order to rotate the reset gear 76 counter-clockwise in FIGS. 6 and 7. This continues to swing the upstanding reset pin 78 on the reset gear 76 counter-clockwise against the depending tab 80 on the high energy lever 42 to continue to swing the high energy lever clockwise in FIG. 5 back to its cocked ready position. The dwell 72 on the reset gear 76 then receives one of the peripheral teeth 70 of the second intermediate gear 68. See FIG. 2.

Figure 7:
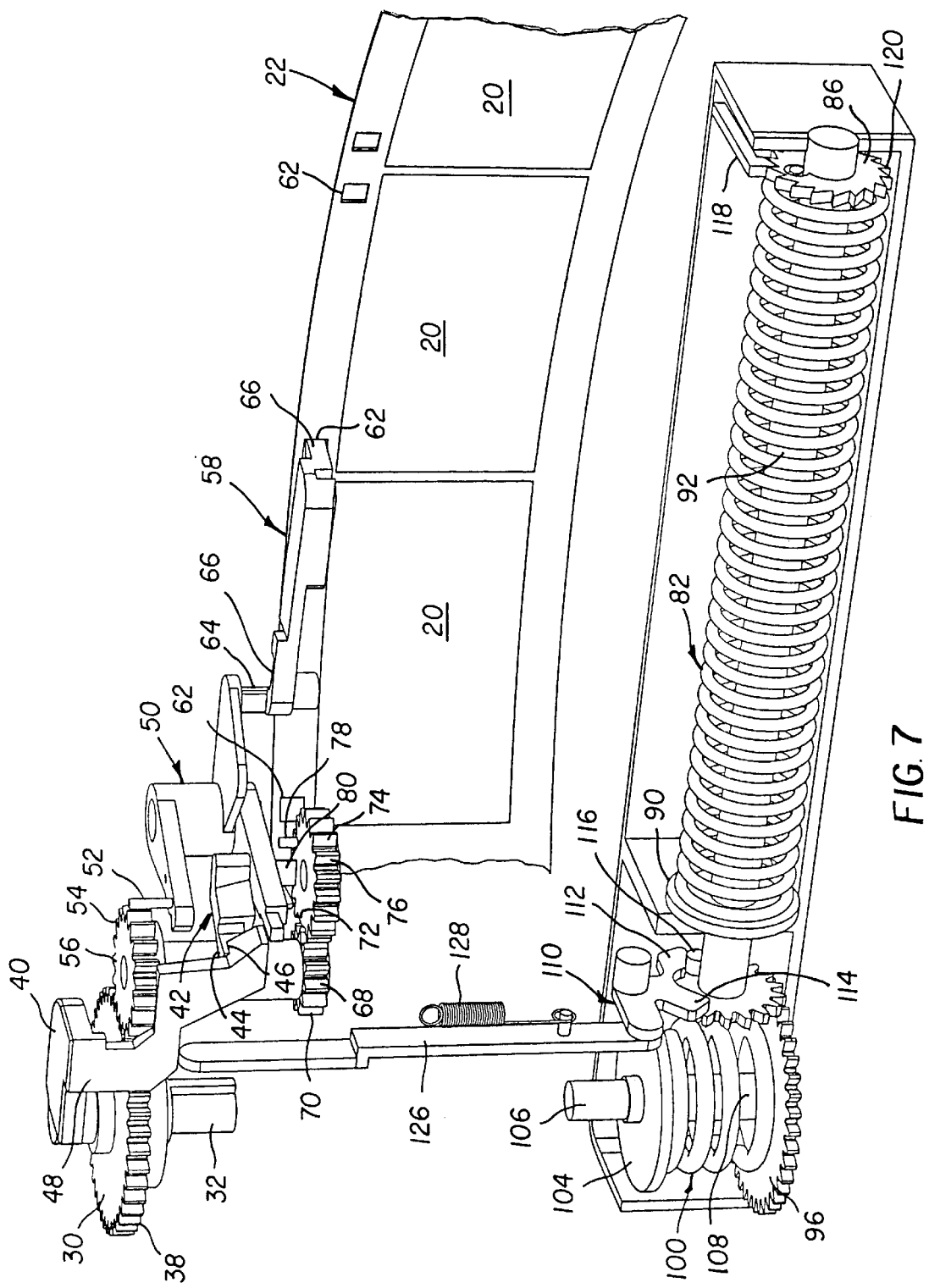

When the depending pin 64 on the metering lever 50 returns to the notch portion 66 of the metering pawl 58, the return spring (not shown) pivots the metering lever clockwise in FIG. 7 to return the arresting pin 52 on the metering lever into engagement with one of the peripheral teeth 54 of the first intermediate gear 56. The filmstrip 22 is then re-metered. See FIG. 2.

The invention has been described with reference to a preferred embodiment. However, it will be appreciated that variations and modifications can be effected by a person of ordinary skill in the art without departing from the scope of the invention.

Parts List 10. one-time-use camera
12. main body part
14. cartridge receiving chamber
16. film cartridge
18. film supply chamber
20. imaging areas
22. filmstrip
24. front aperture
26. shutter blade
28. blade slot
30. metering drive gear
32. keyed stem
34. spool end
36. exposed film roll
38. peripheral teeth
40. shutter release button
42. high energy lever
44. end portion
46. notch portion
48. leg
50. metering lever
52. arresting pin
54. peripheral teeth
56. first intermediate gear
58. metering pawl
60. pawl tooth
62. perforations
64. pin
66. notch portion
68. second intermediate gear
70. peripheral teeth
72. dwell
74. peripheral teeth
76. reset gear
78. reset pin
80. tab
82. major high-torque torsion spring
84. one end
86. winding ratchet
88. another end
90. flange
92. center shaft
94. drive gear
96. driven gear
98. one end
100. minor low-torque torsion spring
102. another end
104. flange
106. keyed stem
108. center shaft
110. release lever
112. angled projection
114. angled projection
116. locking pin
118. anti-backup pawl
120. teeth
122. edge portion
124. opposite portion
126. follower arm
128. return spring

What is claimed is:

1. A camera comprising a film winder rotatable to wind successive exposed imaging areas of a filmstrip onto an exposed film roll, is characterized in that:

a minor spring source of motion is connected to said film winder to rotate the film winder to wind one exposed imaging area of the filmstrip onto the exposed film roll and can be re-energized to again rotate the film winder to wind another exposed imaging area of the filmstrip onto the exposed film roll; and a major spring source of motion is connected with said minor spring source of motion to re-energize the minor spring source of motion after each exposed imaging area of the filmstrip is wound onto the exposed film roll.

2. A camera as recited in claim 1, wherein said major spring source of motion has the capacity to be energized once to re-energize said minor spring source of motion a total number of times at least equal to the total number of successive imaging areas of the filmstrip that are to be exposed.

3. A camera as recited in claim 2, wherein said major and minor spring sources of motion are relatively high torque and low torque providing springs.

4. A camera as recited in claim 3, wherein said torque providing springs are torsional springs.

5. A camera as recited in claim 1, wherein said minor spring source of motion is supported for rotation in one direction to be energized and in the same direction to rotate said film winder to wind one exposed imaging area of the filmstrip onto the exposed film roll.

6. A camera as recited in claim 1, wherein a shutter release button is manually depessible from an original non-depressed position, and a retaining lever engages said major spring source of motion to prevent the major spring source of motion from re-energizing said minor spring source of motion when said shutter release button is in its original non-depressed position and releases the major spring to allow the major spring source of motion to at least partially re-energize the minor spring source of motion as said shutter release button is manually depressed.

7. A camera as recited in claim 6, wherein said release lever re-engages said major spring source of motion to prevent the major spring source of motion from completely re-energizing said minor spring source of motion when said shutter release button is manually depressed, but before the shutter release button is returned to its original non-depressed position, and re-releases the major spring source of motion to allow the major spring source of motion to completely re-energize the minor spring source of motion as the shutter release button is returned to its original non-depressed position.

8. A camera as recited in claim 1, wherein said film winder includes a take-up spool that rotatably supports the exposed film roll and is connected with said minor spring source of motion for the minor spring source of motion to rotate said take-up spool to wind each exposed imaging area of the filmstrip onto the exposed film roll.

9. A method in a camera of rotating a film winder to wind successive exposed imaging areas of a filmstrip onto an exposed film roll, is characterized by the successive steps of:

releasing a major spring source of motion that is connected with a minor spring source of motion for the major spring source of motion to re-energize the minor spring source of motion to permit the minor spring source of motion to rotate the film winder to wind one exposed imaging area of the filmstrip onto the exposed film roll; and engaging the major spring source of motion to prevent it from further energizing the minor spring source of motion.

10. A method as recited in claim 9, wherein the major spring source of motion is energized once sufficiently to re-energize the minor spring source of motion a total number of times at least equal to the total number of successive imaging areas of the filmstrip that are to be exposed.

11. A method as recited in claim 9, wherein a manually depressible shutter release button is manually depressed from an original non-depressed position for the major spring source of motion to be released.

12. A method as recited in claim 11, wherein the manually depressible shutter release button is manually released to return to its original non-depressed position for the major spring source of motion to be engaged.

* * * * *